Feb. 10, 1942. H. C. SMITH 2,272,437
BRAKE MECHANISM
Filed March 31, 1939 3 Sheets-Sheet 1
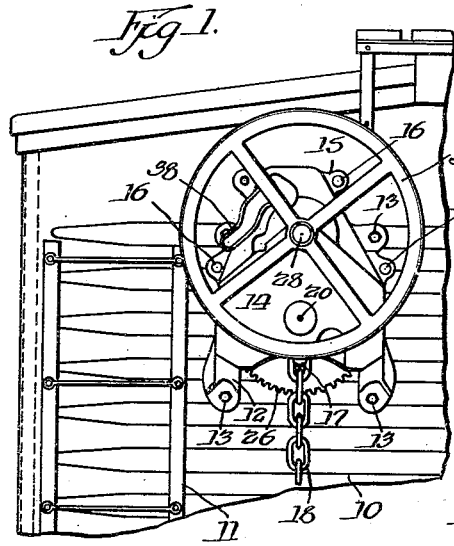
Inventor:
Henry C. Smith Inventor:
Henry C. Smith

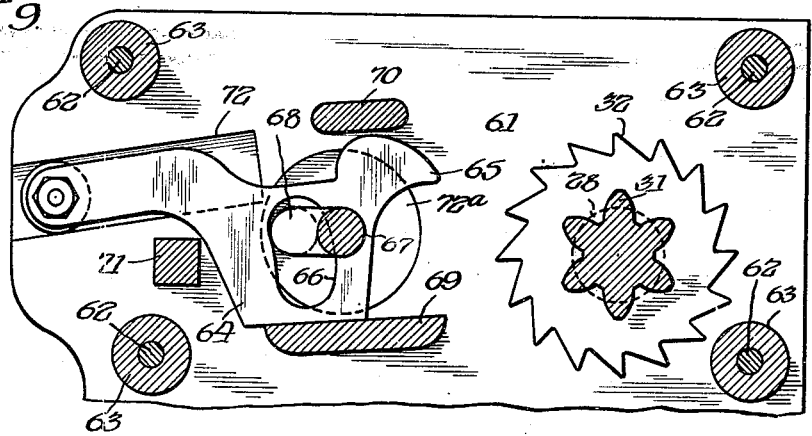
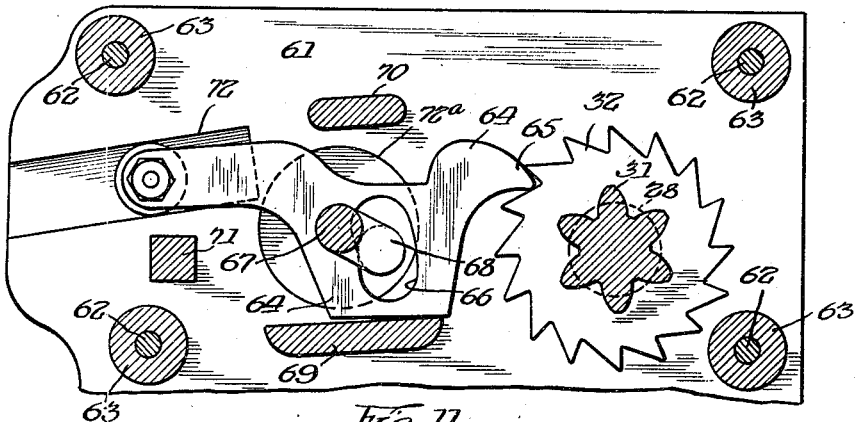
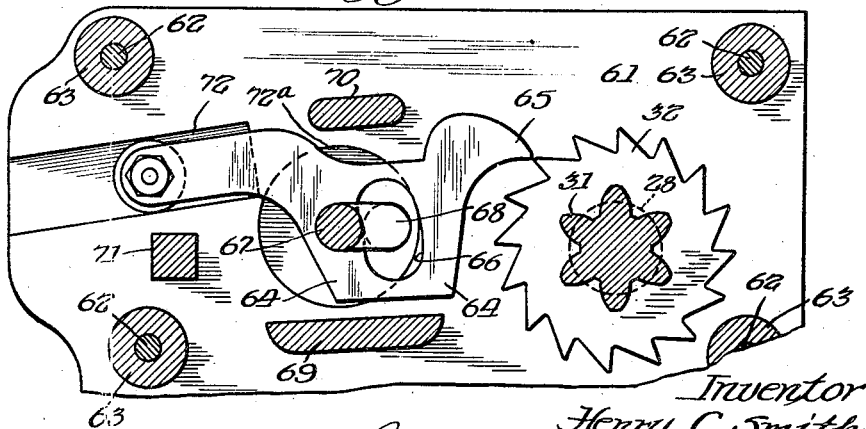

Patented Feb. 10, 1942

2,272,437

UNITED STATES PATENT OFFICE 2,272,437

BRAKE MECHANISM

Henry C. Smith, Chicago, Ill., assignor to Superior Hand Brake Company, Chicago, Ill., a corporation of Illinois Application March 31, 1939, Serial No. 265,067

13 Claims. (Cl. 74—505)

My invention relates to brake mechanism and has particular reference to winding and holding means for the chain and mounting therefor for use in connection with hand brakes for railway cars of the type having a vertical handwheel and adapted to be placed on the end of a car of the box, gondola or other general service type.

The primary object of my invention is the provision of mechanism by means of which the brake applying means is operated to bring the brake shoes against the wheels of the railway car and hold them in this position, with means by which the mechanism is released allowing the brake shoes to be released out of contact with the wheels of the car.

Another and further object of my invention is the provision of a holding and releasing mechanism in which the holding pawl engages with a ratchet wheel by gravity and which also drops out of engagement by gravity with said ratchet wheel when the mechanism is released, and in which the release is with the braking force and not against it, as is common with release devices of this character.

Another and further object of my invention is the provision of a holding means for railway car brakes in which the usual ratchet wheel is employed and a crank shaft provided from which a pawl is suspended, the pawl being so constructed and weighted that in ts normal suspended position the pawl engaging end is in a plane toward the ratchet wheel and out of vertical alignment with the point from which it is suspended, thereby avoiding any danger of the pawl slipping out of engagement with the ratchet wheel and releasing the brakes on the car when not intended.

Another and further object of my invention is the provision of a holding means for railway car brakes which is easily and quickly released without the necessity of the operator turning or holding the hand wheel, which release can be accomplished without danger either to the operator or to the mechanism itself, and in which the release is in the same direction as the thrust on the pawl itself and therefore with the braking force and not against it.

Another and further object of my invention is the provision of a brake mechanism which conforms with the general requirement for safety in the operation of brakes of this type and provides means by which the pawl is brought into engagement with the ratchet in such manner that the point of the pawl will not quickly be worn away, thus providing for long life of the pawl mechanism and also providing means by which the pawl will not become worn in such manner that it may slip out of engagement with the teeth on the ratchet wheel, thereby releasing the brakes or preventing the application of the brakes to the car, resulting in accident to the trainmen handling the car or in damage to the car itself through inability of the trainmen to control it by means of the brakes.

Another and further object of my invention is the provision of a brake mechanism by means of which the pawl is so mounted that its engagement with the ratchet wheel is positive, it will not slip from engagement with the ratchet wheel, and at the same time is easily releasable from the ratchet wheel and when released its direction of travel away from the ratchet wheel is such as to clear the ratchet wheel quickly without undue strain and allowing for quick release of the brake mechanism by the operator.

These and other objects of my invention will be more fully and better understood by reference to the accompanying sheet of drawings, and in which—

Figure 1 is a fragmentary elevational view of a freight car having my brake applied thereto;

Figure 2 is a vertical sectional view through the brake holding mechanism showing the operating parts therefor;

Figure 5 is a sectional elevational view of one end of the operating lever for the pawl mechanism;

Figure 6 is a perspective view of the crank shaft on which the pawl is mounted;

Figure 7 is a side elevational view of the pawl itself;

Figure 8 is an edge elevational view of the pawl shown in Figure 7;

Figure 9 is a view mainly in elevation of a modified form of pawl arrangement showing the pawl out of engagement with the ratchet wheel;

Figure 10 is a view similar to Figure 9 showing the pawl in engagement with the ratchet wheel; and Figure 11 is a view showing the pawl just as it clears the ratchet wheel.

Figure 3:
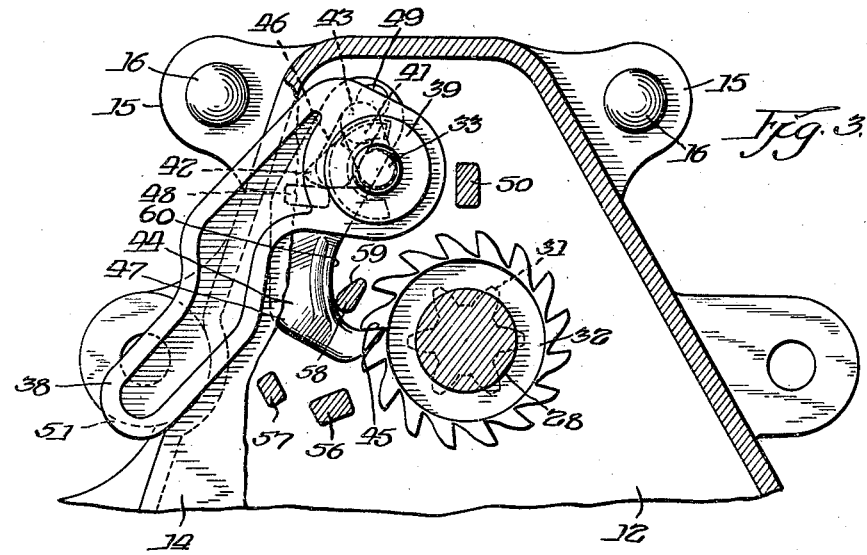
Figure 3 is a sectional view showing a pawl in engagement with the ratchet wheel.

Referring now specifically to the drawings and in which like reference characters refer to like parts throughout, a fragment of a railway car end 10 is shown having the usual ladder 11 fixed thereto. A brake mechanism housing comprising a rear plate 12, is fitted flush against the end 10 of the railway car and secured thereto by means of bolts 13, 13 passing through ears integrally formed with the rear plate 12. A front portion 14 of the housing is fitted over the rear plate 12 and has ears 15, 15 projecting therefrom with rivets 16, 16 passing therethrough and through corresponding ears on the rear plate 12, to hold the front member 14 and the rear member 12 together so as to form a housing for the brake operating mechanism.

Mounted in the lower part of the housing is a winding drum 17 having a chain 18 attached thereto by means of a pin 19, with the drum 17 being mounted upon an axle 20, the ends of which extend through and are mounted in the housing sections 12 and 14. The drum has a channel 21 therein adapted to receive alternate links of the chain 18 as it is wound upon the drum, with the alternate links lying on the outer periphery of the drum surface. The drum has hub portions 22 extending into the front plate 14, with a bearing 23 being provided extending around the hub 22. A longer hub portion 24 extends into the rear plate 12 with a suitable bushing 25 being provided to form a bearing for the rear hub portion 24 of the drum. Also extending over the hub portion 24 is a larger gear wheel 26. This gear wheel 26 has a hub portion 27 with an internal taper therein and which is fitted over the tapered hub 24, with the parts fitted so that the gear wheel 26 and the winding drum 17 are fitted together so as to be in fixed relation with each other. As the gear wheel 26 is rotated the drum 17 is also rotated to wind the chain 18 thereon, the chain extending downward from the winding mechanism either to a pull rod connected to the brake operating mechanism underneath the car or, as is quite common practice, to a bell crank member mounted on the lower end of the car by means of which the direction of pull of the chain 18 is changed from a vertical to a horizontal pull, with the bell crank member being connected to the brake pull rod by either a direct connection or by means of a short length of chain, all of which is common practice in mounting brakes of this type upon railway cars.

In the upper part of the housing a shaft 28 is mounted, with its inner end positioned in the plate 12 and mounted in and passing through a trunnion 29 which is preferably integrally formed with the outer plate 14. The usual hand wheel 30 is mounted on the outer end of the shaft 28 by any appropriate means. A small pinion 31 is mounted adjacent the inner end of the shaft 28 and in mesh with the large gear wheel 26, the pinion 31 being keyed or otherwise fixed to the shaft 28 so that it does not rotate thereon but is rotated with the shaft 28 as it is rotated by means of the hand wheel 30. A ratchet wheel 32 is also provided which is fixed upon the shaft 28 inside of the housing formed by the plates 12 and 14, and is fixed to the shaft 28 in any approved manner so that it is non-rotatably mounted on the said shaft. The ratchet wheel 32, engaged by appropriate holding mechanism hereinafter described, is provided to prevent the rotation of the hand wheel 30 and winding drum 17, as will be more fully described hereinafter.

Mounted in the upper portion of the casing formed by the plates 12 and 14, is a crank shaft 33 having its rear end 34 suitably mounted in a bearing 35 positioned in the rear plate 12 and having a bearing surface 36 adjacent its crank portion positioned in a bearing member 37 mounted in the front plate 14, with its front end projecting beyond and outside of the front plate 14. A handle 38 is mounted thereon and held in position by washer 39 fitted over the projecting end of the bell crank member 33 and against a shoulder 40 formed on the end of the bell crank member 33. Formed integrally with the bell crank member 33 is a lug 41 which projects upward from the surface of the bell crank member 33 near the outer end thereof and which is somewhat elongated and circumferentially extending with respect to the outer contour of the bearing portion 36 of the bell crank member 33. Also formed integrally with the bell crank member 33 and projecting radially therefrom is a projection 42 which coacts with the pawl hereinafter described, and forms means whereby the pawl may be forced into initial engagement with the ratchet wheel 32.

Mounted upon the crank portion 43 of the bell crank member 33 is a pawl 44. This pawl 44 has a tooth 45 at one end thereof for engagement with the ratchet wheel 32 to hold this wheel against rotation, particularly as shown in Figure 3 of the drawings. The pawl 44 has an elongated opening 46 at the upper end thereof into which the crank portion 43 of the bell crank member 33 is fitted. The pawl 44 is curved laterally intermediate its ends to bring the tooth 45 into alignment with the ratchet wheel 32 and is weighted at 47, as shown in Figure 8, so that when the pawl 44 is suspended from the bell crank 33 it hangs substantially in a vertical position, as shown in Figure 7, with the tooth 45 extending laterally and upwardly for engagement with the teeth formed in the ratchet wheel 32.

On one face of the pawl 44 is a lug 48 against which the projection 42 on the bell crank 33 is adapted to engage for pushing the tooth 45 on the pawl into initial engagement with the ratchet wheel 32, if for any reason the teeth on the ratchet wheel 32 should become filled with some foreign substance to prevent the engagement of the tooth 45 with the ratchet teeth, although in normal operation of the device, because of the shape and weight of the pawl 44 and its point of suspension from the bell crank 33, the pawl automatically engages the ratchet wheel 32, and once in engagement with the outer ends of the teeth in the ratchet wheel 32, the normal braking pressure in the ratchet wheel in a counterclockwise direction will pull the tooth 45 deeper into engagement with the teeth in the ratchet wheel 32 rather than to force them outward therefrom. A lug 49 is also provided at the upper end of the pawl 44 which engages against a lug 50 projecting inwardly from the face of the outer housing plate 14, and which serves to partially support the pawl at the upper end thereof in its disengaged position from the ratchet wheel 32, and also prevents the pawl from assuming a canted position, as the under face of the lug 49 is a bearing surface upon the crank portion 43 of the bell crank member 33.

Figure 4:
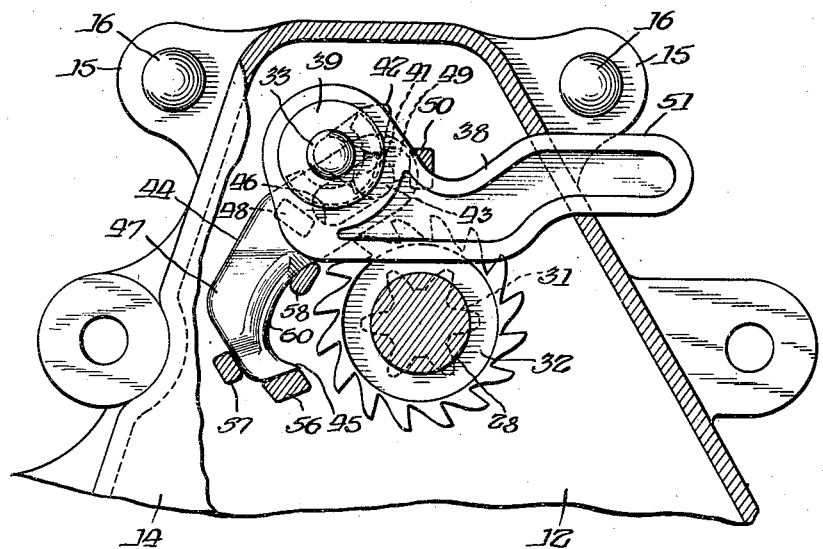
Figure 4 is a similar view to Figure 3 showing the pawl in normal position out of engagement with the ratchet wheel.

The handle 38 has a hand portion 51 and a head portion 52 having an opening therein to receive the outer end of the bell crank member 33, and has a circumferentially extending slot 53 formed in the head portion 52 with shoulder portions 54 and 55 at the ends of the slot 53 which engage against alternate ends of the lug 41 on the crank member 33 to rotate the bell crank member 33 in order to bring the pawl into engagement with the ratchet 32 as shown in Figure 3, or to release the pawl and allow it to move into disengaged position from the ratchet 32 as shown in Figure 4. Lugs 56 and 57 are provided on the inner face of the outer housing 14 which are inwardly extending and upon which the free end of the pawl 44 drops when in full disengaged position from the ratchet 32. Another lug 58 is provided, inwardly projecting from the inner face of the outer housing 14, the lug 58 having a cam face 59 upon which the pawl 44 rests when in disengaged position, and over which the curved surface 60 of the pawl travels as it moves into and out of engaged position with the ratchet 32.

In Figures 9, 10 and 11, a modified form of the pawl mechanism is shown, these views being elevational views looking outward against a modified front plate plate 61 and which with the rear plate 12 forms a housing for the brake structure, the plate 61 being secured to the rear plate 12 by means of studs 62, 62 upon which spacers 63, 63 are positioned. The brake shaft 28 and small gear wheel 31 and ratchet wheel 32 are the same as described in the preferred form of the device. A pawl 64 is provided which has a tooth 65 at its forward end and an elliptical slot 66 therein, with a bell crank member 67 having a crank portion 68 extending into the slot 66 of the pawl 64, by the rotation of which the pawl is moved into and out of engagement with the ratchet wheel 32. An elongated lug 69 is provided which projects inwardly from the face of the plate 61 and upon which the lower edge of the pawl 64 rests and operates in sliding engagement therewith. A second elongated lug 70 is provided which is integrally formed on the inner face of the plate 61 and forms a guide for the rounded end of the tooth 65 in its path of movement toward and away from the ratchet wheel 32. A third lug 71 projects inwardly from the face of the plate 61 and is adapted to be engaged by the curved rear face of the pawl 64 when the pawl 64 is in out-of-engaged position with the ratchet 32. A slot 72 is provided in the face of the plate 61 within which a roller on the tail portion of the pawl is positioned to stabilize the pawl 64 and prevent its turning in rotation upon the bell crank as it is moved into and out of engagement with the ratchet wheel 32. A recess 72a, circular in form, is provided in the face of the plate 61 which forms a guide for the crank portion of the bell crank 68 as this member is turned to force the pawl 64 into and out of engagement with the ratchet wheel 32.

In operation of the preferred form of the device, when it is desired to set the brakes the handle 38 is moved into the position shown in Figure 3. In moving the handle 38 from the position shown in Figure 4 to that shown in Figure 3, the operator grasps the handle and turns it in a counterclockwise direction, moving it upward from its resting place on the trunnion 29 until the handle 51 is in a substantially vertical position. In this position the shoulder 54 is engaged against one end of the elongated lug 41 on the bell crank member 33. Continued movement of the handle 51 in a counterclockwise direction rotates the bell crank member 33 and moves the crank portion of this member 43 in a counterclockwise direction from the position shown in Figure 4 to that of Figure 3. As the member 43 moves into this position, the pawl 44 is lifted so that the lower end is free of the lugs 56 and 57 and the surface 60 of the pawl slides upon the lug 58 for a short distance upward of the travel of the pawl 44 until the crank portion 43 is in substantial alignment with the surface 59 on the lug 58, when the upper end of the pawl 44 is swung outward and the tooth 45 comes into engagement with one of the teeth on the ratchet 32.

In the meantime, the bell crank portion 43 has been turned to or very slightly beyond dead center position until one of the arms of the crank portion 43 engages against a lug 73 outwardly projecting from the front face of the plate 12, in which position the bell crank member comes to rest against this shoulder and further rotation of the bell crank 33 is prevented. In this position the pawl 44 is suspended from the crank portion 43 of the bell crank member 33 with the tooth 45 in engagement with the ratchet wheel 32, and while in this position the pawl 44 is slightly out of a vertical line, as will be noticed by a comparison of the position of the pawl, in Figures 3 and 7. The pawl is prevented from moving into substantial vertical position, as shown in Figure 7, by its contact with the ratchet wheel 32, so that the normal weight of the pawl is such that the tooth 45 will be brought into engagement with the ratchet wheel 32 when the crank 33 is turned to the position shown in Figure 3.

If during the rotation of the handle 38 in a counterclockwise direction an obstruction is encountered by the tooth, such as rust, snow, ice or the like, in the teeth of the ratchet 32, the lug 42 on the bell crank member 33 engages with the lug 48 on the pawl 44 and by force exerted on the handle 38 the tooth 45 can be forced into a position so that the point of the tooth 45 is engaged by the end of one of the teeth on the ratchet 32. When the pawl is in this position due to the contour of the tooth 45 and that of the ratchet wheel 32, the thrust of the brake pressure forces the tooth 45 into more firm engagement with the ratchet 32, thereby insuring that the pawl 44 surely engages the ratchet 32 and there is no slipping of the pawl out of engagement with the ratchet wheel 32, thereby throwing the brakeman or operator from the car while engaged in setting the brakes.

After the pawl is brought into the position shown in Figure 3, the operator by turning the brake wheel 30 in a clockwise direction winds the chain 18 upon the drum 17 and thereby brings the brake shoes into engagement with the wheels of the car and in effect setting the brakes. During this operation the pawl 44 swings freely on the crank portion 43 of the member 32 and is moved successively out of one tooth to the other until the brakes are in set position or tightened to the degree which the operator wishes, and they can be allowed to remain in set position if desired. During this operation, the pawl moves outward a sufficient distance so that the lug 48 engages against the extension 42 on the bell crank 33 so that the handle is moved in a clockwise direction very slightly, but this movement is very limited and there is no chattering or throwing of this member as the brakes are tightened.

After the brakes are set as described, and it is desired to release them, this operation can be accomplished in one of two ways—first, if the operator desires to completely release the brakes, the handle is turned from the position shown in Figure 3 to the release position shown in Figure 4, and in so doing the operator grasps the end of the handle and turns it in a clockwise direction through an arc of movement less than 180° until the handle is in a substantially vertical position, in which position a slight push farther in a clockwise direction by the operator causes the bell crank member to rotate from its off center position, and immediately upon the crank portion 43 passing over center, the braking force throws the pawl out of engagement with the ratchet wheel 32 and the brakes are released.

If the operator should desire only a partial release of the brakes, the handle is moved to the position until the release is accomplished, and then the operator quickly reverses the position of the handle, pulling the pawl back into engagement with the ratchet 32 while the brakes are still under tension, and the brakes on the car may be loosened in this manner. Experience will soon teach the operator how quickly the handle has to be moved in order to accomplish this result.

If desired, the brakes may also be released by the operator turning the handle in a clockwise direction from the position shown in Figure 3 until the handle is in a substantially vertical position where it will be held in this position by reason of the friction between the ratchet wheel 32 and the tooth 45 on the end of the pawl. Then the operator may turn the hand wheel 30 slightly in a brake tightening position, and in so doing will rotate the ratchet 32 also in a clockwise position which brings the long inclined outer face of the teeth against the outer inclined face of the tooth 45, rotating the pawl, the hand lever and the bell crank sufficiently so that the crank member 43 is carried over center, in which position as the brakes are released the pawl 44 in effect is kicked out of engagement with the ratchet 32 and the brakes released in this fashion. As the pawl is released after the crank member passes over center, the upper end of the pawl is carried in a path of rotation by the crank member 43, thereby bringing the cam surface 60 and the pawl into engagement with the rounded surface 59 on the lug 58 so that the pawl 44 rides out of engagement with the ratchet on this surface until it comes into the position shown in Figure 4 and at rest upon the lugs 50, 56, 57 and 58, with the handle resting upon the trunnion 29 extending outward from the front plate 14. In this position the handle is at rest and does not exert any force upon any of the moving parts whatsoever.

In the operation of the device shown in Figures 10 and 11, a hand lever is provided, by means of which the crank shaft 68 is rotated so that as the pawl travels into engagement its central portion is moved in substantially a circular path, bringing the tooth 45 into engagement with the ratchet wheel 32, particularly as shown in Figure 10. In this position the bellcrank 68 is turned slightly beyond a dead center position so that the pawl is held against movement until after the crank member is turned in a counterclockwise position, where it remains until it is off center and lifts the pawl slightly, in which position the braking force throws the pawl clear of the ratchet wheel 32 and the brakes are thereby released.

In the tightening operation, after the pawl is placed in position for engagement with the ratchet 32, as the ratchet wheel 32 is turned in a clockwise direction, the pawl moves in a vertical position without moving the bell crank in any manner so that it operates freely upon the bell crank portion in this manner to allow for sufficient freedom of movement for the end 65 of the pawl to pass over the teeth of the ratchet wheel 32. After the brakes have been sufficiently set or tightened, the pawl engages, as shown in Figure 10, to hold the ratchet 32 against rotation.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of the invention.

I claim:

1. Operating means for railway car brakes comprising, a housing, a shaft in said housing, a hand wheel on the said shaft, cooperating holding and winding means having a ratchet wheel connected therewith, a crank shaft, a pawl weighted at its lower end and having its ratchet engaging end extending laterally and upward therefrom suspended from said crank shaft, and a handle connected to said crank shaft.

2. Operating means for railway car brakes comprising, a housing, a shaft in said housing, a hand wheel on the said shaft, cooperating holding and winding means having a ratchet wheel connected therewith, a crank shaft, a pawl having its ratchet engaging end extending laterally and upward therefrom suspended from said crank shaft, and a handle connected to said crank shaft.

3. Operating means for railway car brakes comprising, a housing, a shaft in said housing, a hand wheel on the said shaft, cooperating holding and winding means having a ratchet wheel connected therewith, a rotatably mounted crank shaft having its axis of rotation in offset vertical relation with the axis of said ratchet wheel, a pawl suspended from the said crank shaft having a weighted lower end and having a ratchet engaging tooth thereon extending laterally therefrom, and a handle having a lost motion connection secured to said crank shaft.

4. Operating means for railway car brakes comprising, in combination, a vertical housing, a shaft in said housing, a hand wheel outside of said housing on said shaft, cooperating gears one of which is mounted on said shaft, a winding drum connected with one of said gears, a ratchet wheel on said shaft, a crank shaft having its axis of rotation above and to one side of the said ratchet wheel, a pawl suspended from said crank shaft, stops on said housing to limit the rotative movement of the said crank shaft in each direction, and an operating handle connected to said crank shaft.

5. Operating means for railway car brakes comprising, in combination, a vertical housing, a shaft in said housing, a hand wheel outside of said housing on said shaft, cooperating gears one of which is mounted on said shaft, a winding drum connected with one of said gears, a ratchet wheel on said shaft, a crank shaft having its axis of rotation above and to one side of the said ratchet wheel, a pawl suspended from said crank shaft, stops on said housing to limit the rotative movement of the said crank shaft, and an operating handle connected to said crank shaft, the said housing having support means thereon for the said pawl when in out of engaged position with the said ratchet wheel.

6. Operating means for railway car brakes comprising, in combination, a vertical housing, a shaft in said housing, a hand wheel outside of said housing on said shaft, cooperating gears one of which is mounted on said shaft, a winding drum connected with one of said gears, a ratchet wheel on said shaft, a crank shaft having its axis of rotation above and to one side of the said ratchet wheel, a pawl suspended from said crank shaft, stops on said housing to limit the rotative movement of the said crank shaft in each direction, and an operating handle connected to said crank shaft, the said housing having a lug thereon upon which the lower end of the pawl rests when in out of engaged position with respect to said ratchet wheel.

7. Operating means for railway car brakes comprising, in combination, a vertical housing, a shaft in said housing, a hand wheel outside of said housing on said shaft, cooperating gears one of which is mounted on said shaft, a winding drum connected with one of said gears, a ratchet wheel on said shaft, a crank shaft having its axis of rotation above and to one side of the said ratchet wheel, a pawl suspended from said crank shaft having a cam surface thereon, stops on said housing to limit the rotative movement of the said crank shaft, an operating handle connected to said crank shaft, and a cam member upon which the said pawl moves into and out of engagement with the said ratchet wheel.

8. Operating means for railway car brakes, comprising, in combination, a vertical housing, a shaft in said housing, a hand wheel outside of said housing on said shaft, cooperating gears one of which is mounted on said shaft, a winding drum connected with one of said gears, a ratchet wheel on said shaft, a crank shaft having its axis of rotation above and to one side of the said ratchet wheel, a pawl suspended from said crank shaft having a cam surface thereon, stops on said housing to limit the rotative movement of the said crank shaft, and an operating handle connected to said crank shaft, the said housing having a lug thereon over which the cam surface of the pawl moves into and out of engagement with the said ratchet wheel.

9. Operating means for railway car brakes comprising, in combination, a vertical housing, a shaft in said housing, a hand wheel outside of said housing on said shaft, cooperating gears one of which is mounted on said shaft, a winding drum connected with one of said gears, a ratchet wheel on said shaft, a crank shaft having its axis of rotation above and to one side of the said ratchet wheel and having a projection thereon, a pawl suspended from the crank portion of said crank shaft having a lug thereon adapted to be engaged by the projection on the crank shaft whereby the pawl may be forced into initial engagement with the said ratchet wheel, and an operating handle on the crank shaft.

10. Operating means for railway car brakes comprising, in combination, a vertical housing, a shaft in said housing, a hand wheel outside of said housing on said shaft, cooperating gears one of which is mounted on said shaft, a winding drum connected with one of said gears, a ratchet wheel on said shaft, a crank shaft having its axis of rotation above and to one side of the said ratchet wheel and having a projection thereon extending outwardly therefrom, a pawl suspended from the crank portion of said crank shaft having a lug thereon adapted to be engaged by the projection on the crank shaft whereby the pawl may be forced into initial engagement with the said ratchet wheel, and an operating handle on the crank shaft.

11. Brake operating mechanism for railway cars comprising, in combination, a vertical housing, a shaft mounted therein, a brake wheel on said shaft outside of said housing, a gear wheel on said shaft, a ratchet wheel also on said shaft, a second gear wheel in mesh with said first mentioned gear wheel, a winding drum connected to said second gear wheel, a crank shaft mounted in said housing, a pawl pivotally mounted on the crank shaft, an operating handle connected to said bell crank having a lost motion connection to said crank shaft, stops on said housing to limit the rotative movement of the crank shaft in each direction, a support member for the lower end of said pawl, and a camming lug on the housing upon which the pawl operates.

12. Brake operating mechanism for railway cars comprising, in combination, a vertical housing, a shaft mounted therein, a brake wheel on said shaft outside of said housing, a gear wheel on said shaft, a ratchet wheel also on said shaft, a second gear wheel in mesh with said first mentioned gear wheel, a winding drum connected to said second gear wheel, a crank shaft mounted in said housing, a pawl having an elongated opening therein pivotally mounted on the crank shaft, an operating handle connected to said crank shaft having a lost motion connection to said crank shaft, stops on said housing to limit the rotative movement of the crank shaft in each direction, a support member for the lower end of said pawl, and a camming lug on the housing upon which the pawl operates.

13. In combination with brake operating mechanism, a housing, a holding ratchet, a crank shaft in said housing, a pawl pivotally suspended on the crank portion of the crank shaft through an elongated opening in the pawl and having its ratchet engaging end extending toward the holding ratchet and being in a substantially vertical position at one side of the holding ratchet when in engagement with the said ratchet, a limit stop for the crank shaft, and an operating handle connected to the said crank shaft.

HENRY C. SMITH.

CERTIFICATE OF CORRECTION.

Patent No. 2,272,437.                                            February 10, 1942.

HENRY C. SMITH.

It is hereby certified that error appears in the printed specification of the above numbered patent requiring correction as follows: Page 1, first column, line 30, for "ts" read --its--; page 3, first column, line 19, for "front plate plate 61" read --front plate 61--; page 5, second column, line 27, claim 11, for "bell crank" read --crank shaft--; and that the said Letters Patent should be read with this correction therein that the same may conform to the record of the case in the Patent Office.

Signed and sealed this 7th day of April, A. D. 1942.

(Seal)

Henry Van Arsdale,
Acting Commissioner of Patents.